(12) United States Patent
Koenen

(10) Patent No.: US 6,304,945 B1
(45) Date of Patent: Oct. 16, 2001

(54) METHOD AND APPARATUS FOR MAINTAINING CACHE COHERENCY IN A COMPUTER SYSTEM HAVING MULTIPLE PROCESSOR BUSES

(75) Inventor: David J. Koenen, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/311,082

(22) Filed: May 13, 1999

(51) Int. Cl.$^7$ .................................................. G06F 12/08
(52) U.S. Cl. ............................................................ 711/141
(58) Field of Search ..................................... 711/118, 119, 711/124, 141, 144, 145

(56) References Cited

U.S. PATENT DOCUMENTS

| | | | | |
|---|---|---|---|---|
| 5,535,116 | * | 7/1996 | Gupta ..................................... | 364/134 |
| 5,848,434 | * | 12/1998 | Young et al. ........................ | 711/144 |
| 5,897,656 | | 4/1999 | Vogt et al. ............................ | 711/141 |
| 6,049,845 | * | 4/2000 | Bauman et al. ...................... | 710/113 |
| 6,078,997 | * | 6/2000 | Young et al. ......................... | 711/144 |

* cited by examiner

Primary Examiner—Kevin L. Ellis
(74) Attorney, Agent, or Firm—Williams, Morgan & Amerson, P.C.

(57) ABSTRACT

A computer system includes a plurality of processor buses, and a memory bank. The plurality of processors is coupled to the processor buses. At least a portion of the processors have associated cache memories arranged in cache lines. The memory bank is coupled to the processor buses. The memory bank includes a main memory and a distributed coherency filter. The main memory is adapted to store data corresponding to at least a portion of the cache lines. The distributed coherency filter is adapted to store coherency information related to the cache lines associated with each of the processor buses. A method for maintaining cache coherency among processors coupled to a plurality of processor buses is provided. Lines of data are stored in a main memory. A memory request is received for a particular line of data in the main memory from one of the processor buses. Coherency information is stored related to the lines of data associated with each of the processor buses. The coherency information is accessed based on the memory request.

39 Claims, 3 Drawing Sheets

METHOD AND APPARATUS FOR MAINTAINING CACHE COHERENCY IN A COMPUTER SYSTEM HAVING MULTIPLE PROCESSOR BUSES

BACKGROUND OF THE INVENTION

1. Field of the Invention

This invention relates generally to computer systems having multiple processors with cache memories, and, more particularly, to a method and apparatus for maintaining cache coherency in a computer system having multiple processor buses.

2. Description of the Related Art

To a great degree, the speed of a computer system is determined by its processing bandwidth, and the amount of data it may readily retrieve. The processing power is determined, in part, by the number of processors in the computer system and the speed of those processors. Typically, data is read from a fixed storage device (e.g., hard disk) and stored in a main memory device in the computer system for later retrieval by the processor(s). Many transactions in the computer system are directed toward reading or writing to the main memory. To increase the total capacity of the main memory, it is common to divide the main memory into one or more separate memory banks, each having an associated memory controller. Usually, the memory controllers are coupled to a single, shared memory bus.

In many computer systems, multiple processors are used to increase system performance. One or more of these processors typically have a cache memory. A cache memory maintains a local copy of selected lines of data contained in the main memory for rapid retrieval. Cache memories are typically implemented using fast, static random access memories (SRAM), and main memories are typically implemented in higher-density, but slower, dynamic random access memories (DRAM). Because two or more processors may be involved with executing a single software application, the same memory lines may be stored in the cache memories of different processors.

Past computer systems have included multiple processors and multiple memory controllers coupled to the same shared bus. As the frequency of the bus increases, the number of electrical loads supportable on the bus decreases. To maintain or increase the number of processors while increasing the bus speed, the processors are split across multiple processor buses. Due to the segregation of processors onto separate processor buses, it is necessary to maintain the coherency of the processor cache memories across the buses.

In general, coherency is maintained by identifying the cache state for every cached line in the system. Cache line states may be invalid, shared, or owned. Invalid states indicate that the line is not cached anywhere in the system. The shared state indicates that the line may be present in one or more processor caches. The owned state indicates that the line may be in an exclusive or modified state in one of the caches.

One technique for maintaining cache coherency involves the use of a cache directory associated with each of the memory controllers. Each memory controller accesses mutually exclusive address ranges. The cache directory stores the status of each of the cacheable memory lines governed by the associated memory controller. Due to the large number of cacheable lines, the cache directory is typically large, and is generally implemented in higher density, but slower, DRAM. Faster memories, such as SRAM, are cost-prohibitive due to the required capacity of the cache directory. A typical DRAM access may require about 16 clock cycles, while the corresponding SRAM access may take only about 3 clock cycles. As a result of the slower access time, cache directory accesses introduce significant latency to memory accesses.

Another technique uses a local bus snoop filter for each of the processor buses. The local bus snoop filter is checked for each cacheable memory request. Also, the local bus snoop filters associated with each of the other processor buses (i.e., remote bus snoop filters) must be checked. This, in effect, multiplies each snoop request into N−1 snoop requests, where N is the number of processor buses in the computer system. The local bus snoop filter technique is also susceptible to contention when multiple snoop requests are received from local bus snoop filters associated with other processor buses at or near the same time. As a result, coherency checks may have to be placed in a queue and evaluated in order. Because each check may require several clock cycles to complete, the queue may add significant latency to a particular request.

Another coherency maintenance technique involves the use of a tertiary cache between the local processor buses and the shared memory bus. To be effective, the size of a particular cache level is typically almost an order of magnitude greater in size than the previous level. Because current microprocessors can support secondary caches on the order of 2 to 4 MB, the tertiary cache would need to be about 16 to 32 MB to be effective. Such large, high-speed memories are prohibitively expensive. Also, software applications with random memory accesses or high data migration would tend to saturate the shared memory bus. Moreover, the high number of loads necessary to support the tertiary cache on a high frequency bus may generate the same electrical problems leading to the need to segregate the processors.

The present invention is directed to overcoming, or at least reducing the effects of, one or more of the problems set forth above.

SUMMARY OF THE INVENTION

An aspect of the present invention is seen in a computer system including a plurality of processor buses, and a memory bank. The plurality of processors is coupled to the processor buses. At least a portion of the processors have associated cache memories arranged in cache lines. The memory bank is coupled to the processor buses. The memory bank includes a main memory and a distributed coherency filter. The main memory is adapted to store data corresponding to at least a portion of the cache lines. The distributed coherency filter is adapted to store coherency information related to the cache lines associated with each of the processor buses.

Another aspect of the present invention is seen in a method for maintaining cache coherency among processors coupled to a plurality of processor buses. Lines of data are stored in a main memory. A memory request is received for a particular line of data in the main memory from one of the processor buses. Coherency information is stored related to the lines of data associated with each of the processor buses. The coherency information is accessed based on the memory request.

BRIEF DESCRIPTION OF THE DRAWINGS

The invention may be understood by reference to the following description taken in conjunction with the accompanying drawings, in which like reference numerals identify like elements, and in which.

Figure 1:
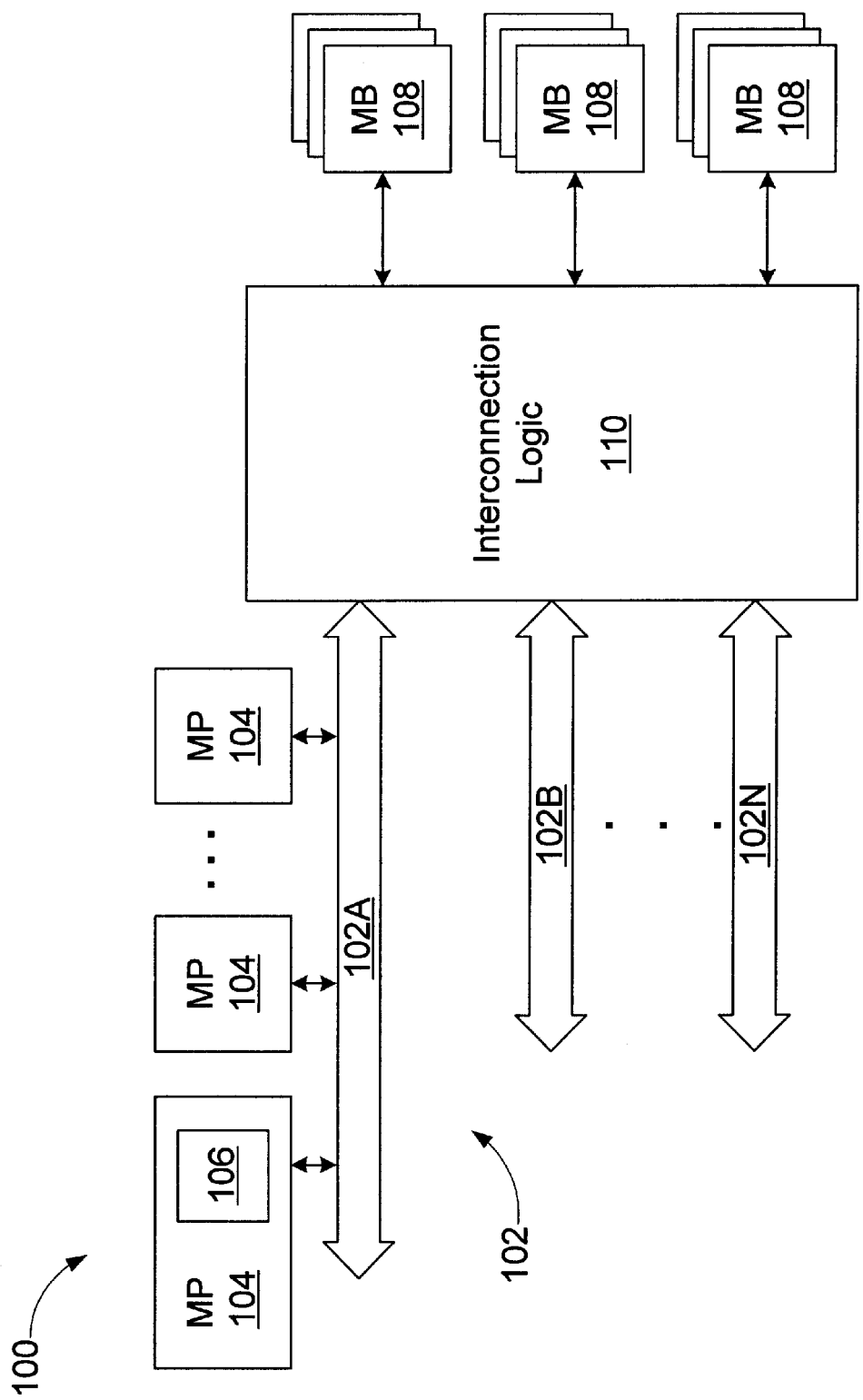
FIG. 1 is a simplified block diagram of a computer system having multiple processor buses in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the figures, and in particular to FIG. 1, a simplified block diagram of a computer system 100 is provided. The computer system 100 includes a plurality of processor buses 102, each supporting one or more processors 104. For clarity and ease of illustration, only the processors 104 associated with one of the processor buses 102 are shown. It is contemplated that the computer system 100 may have any number of processor buses 102, with zero or more processors 104 on each processor bus 102. One or more of the processors 104 has an associated cache memory 106. Typically, all of the processors 104 will be of similar make and will each have an associated cache memory 106. The computer system 100 also includes one or more memory banks 108. The specific number of processor buses 102, processors 104, and memory banks 108 is application dependent, and the present invention may be adapted for use with any number of these components.

Interconnection logic 110 couples the processor buses 102 to the memory banks 108 for communication therebetween. The specific construct of the interconnection logic 110 is not material to the practice of the present invention, and, for clarity, is not discussed in further detail herein.

Figure 2:
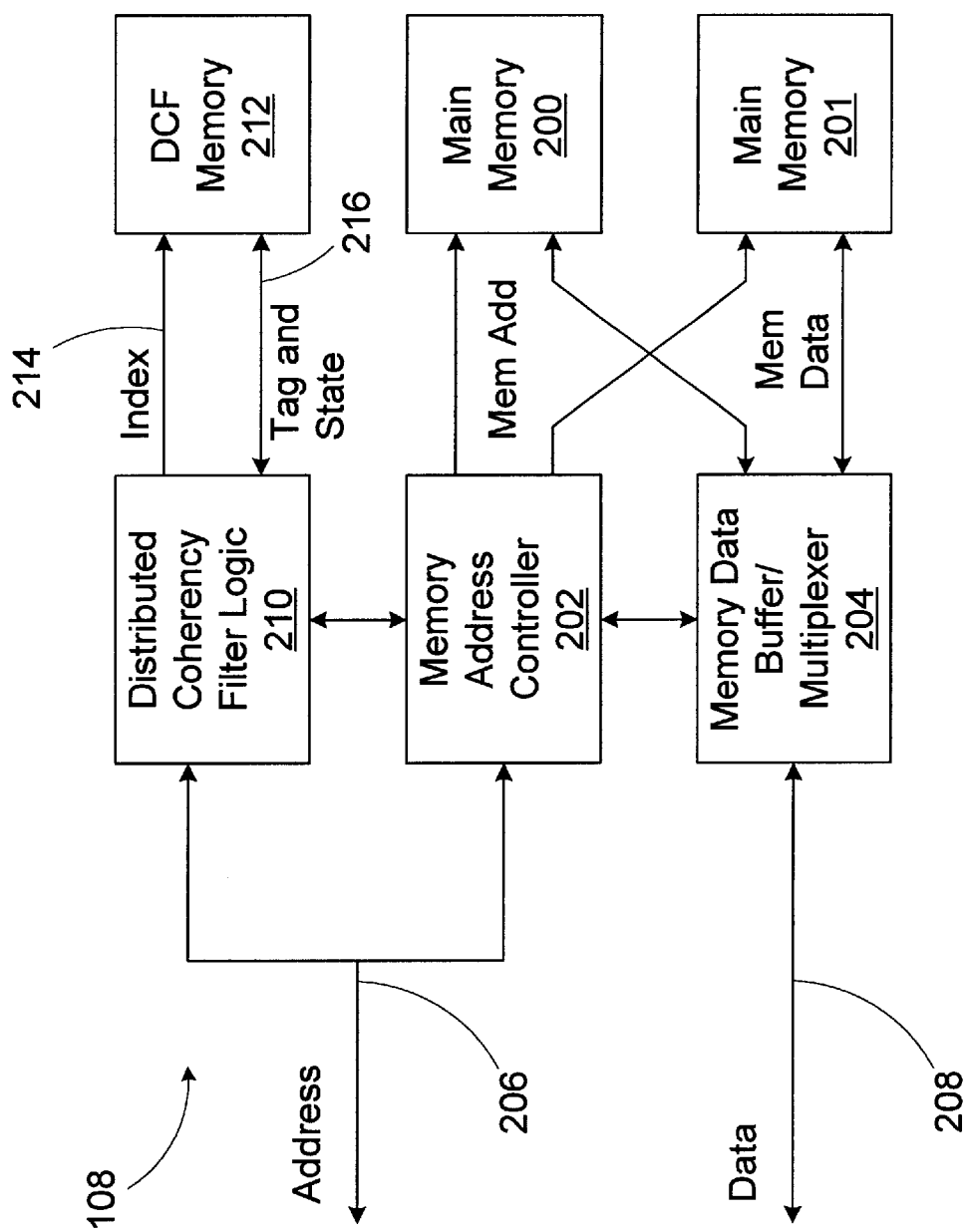
FIG. 2 is a simplified block diagram of a memory bank of the computer system of FIG. 1.

Turning now to FIG. 2, a simplified block diagram of a particular memory bank 108 is illustrated. The memory bank 108 includes two main memories 200, 201. Two main memories 200, 201 are provided in the exemplary illustration, but it is contemplated that a different number of main memories 200, 201 may be used, depending on the specific implementation. In the illustrated embodiment, the main memories 200, 201 are commonly available dynamic random access memories (DRAM). The main memories 200, 201 are accessed by a memory address controller 202. The memory address controller 202 provides a memory address to the main memories 200, 201 for accessing storage locations therein. Data used in conjunction with the accesses to the main memories 200, 201 is held in a memory data buffer/multiplexer 204. An address bus 206 provides addresses to the memory address controller 202, and data is transferred to and from the memory data buffer/multiplexer 204 on a data bus 208.

The memory bank 108 also includes distributed coherency filter logic (DCF logic) 210 coupled to the address bus 206 in parallel with the memory address controller 202.

Accordingly, addresses provided on the address bus 206 are generally simultaneously received by both the memory address controller 202 and the DCF logic 210. The DCF logic 210 interfaces with a DCF memory 212 for providing cache tag and state information (i.e., coherency information) pertaining to certain data stored in the main memories 200, 201.

The DCF logic 210 receives addresses from the address bus 206 in parallel with the memory address controller 202. Accordingly, only one transaction is required to access both. In response to a request, the DCF logic 210 accesses the DCF memory 212 to determine the status of the corresponding cache line, which may or may not be stored in one of the cache memories 106 of one of the processors 104. The DCF logic 210 is adapted to track only the cache lines associated with its corresponding memory bank 108. Because the memory banks 108 have mutually exclusive address ranges, it is not possible for one address to reference more than one of the memory banks 108.

Figure 3:
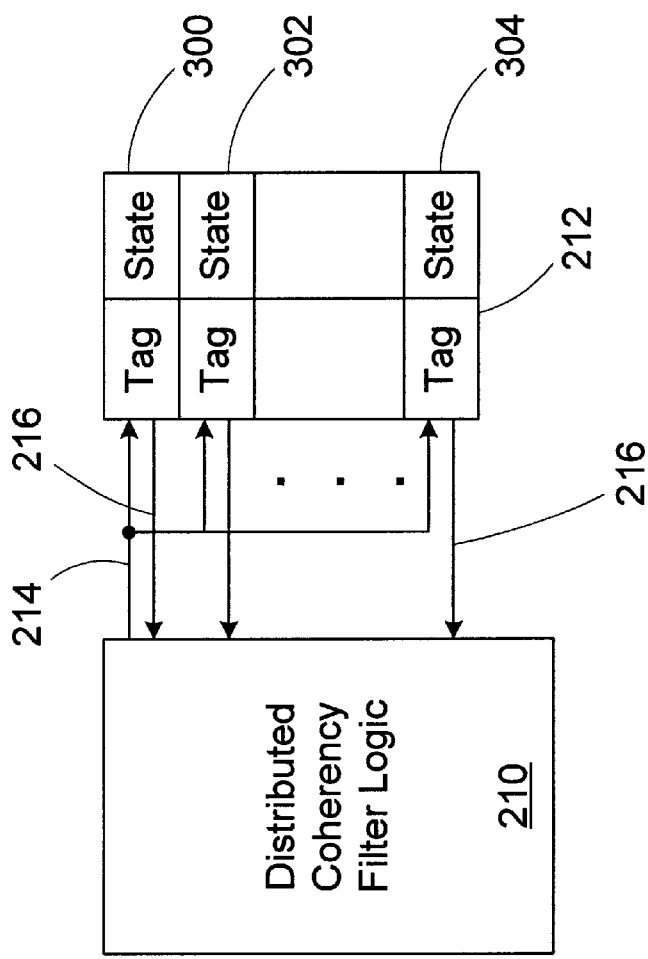
FIG. 3 is a simplified block diagram illustrating the interface between the distributed coherency filter and the DCF memory of FIG. 2.

The nature of the interface between the DCF logic 210 and the DCF memory 212 is described in greater detail in reference to FIG. 3. The DCF memory 212 is subdivided into blocks 300, 302, 304, each of which is associated with a particular processor bus 102. The block 300 is associated with a first processor bus 102A, the block 302 is associated with a second processor bus 102B, and the block 304 is associated with a final processor bus 102N, where N is the number of processor buses in the computer system 100. Each block 302, 304, 306 maintains cache state information for the cache lines stored on its associated processor bus 102 (i.e., A, B, N, respectively). In the illustrated embodiment, the DCF memory 212 is a high-speed SRAM. The DCF memory 212 is accessed based on a direct mapping of at least a portion of the address.

Figure 4:
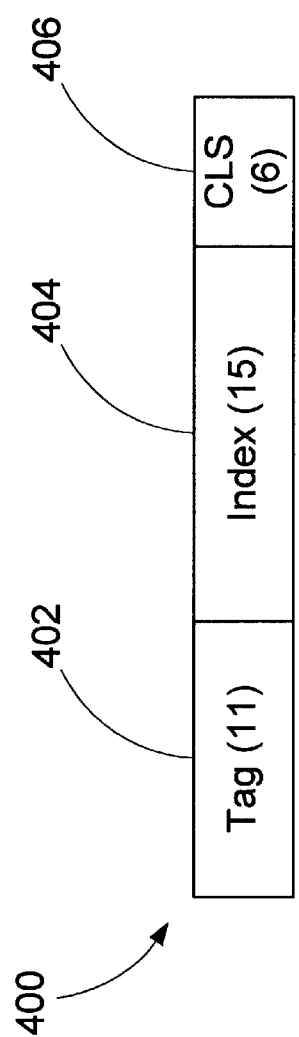
FIG. 4 is a diagram illustrating the partitioning of an address received on the address bus of FIG. 2.

Turning briefly to FIG. 4, an illustration of the address partitioning is provided. An address 400 includes a tag portion 402, an index portion 404, and a cache line size portion 406. The index portion 404 is used to access the DCF memory 212, and accordingly, the number of bits in the index portion 404 determines the number of cache lines that can be addressed. The number of bits in the cache line size portion 406 determines the number of bytes in a cache line. In the illustrated embodiment, the address 400 is 32 bits. The index portion 404 is 15 bits, corresponding to 32K cache lines, and the cache line size portion 406 is 6 bits, corresponding to a cache line size of 64 bytes. The number of bits in the address 400, the number of bits in the index portion 404, and the number of bits in the cache line size portion 406 are application dependent variables.

Returning to FIG. 3, the DCF logic 210 fans out the index portion 404 of the address 400 to each of the blocks 300, 302, 304 in parallel to determine the status of the corresponding cache line. Because the DCF logic 210 accesses the blocks 300, 302, 304 in parallel, the status of the cache line on all of the processor buses 102 may be determined simultaneously. Again, a single transaction on the address bus 206 may be used to retrieve data from the main memories 200, 201, if required, and to check the status of the cache line on all of the processor buses 102 for that particular cache line address. Prior art techniques typically require multiple transactions to achieve such a result, thus reducing their efficiency.

The DCF logic 210 is accessed on every cacheable memory reference targeting the memory bank 108. Based on the status retrieved from the DCF memory 212, the DCF logic 210 issues transactions to retrieve, invalidate, or change the status of the cache line.

The operation of the DCF logic 210 is further described through the following examples. A read transaction for a particular cache line is received on the address bus 206.

The address is provided to the DCF logic 210 and the memory address controller 202 in parallel. The memory address controller 202 begins the process of retrieving the associated line of data from the main memories 200, 201, while the DCF logic 210 determines the status of any corresponding cache lines across all of the processor buses 102. If the request misses the DCF logic 210, a separate transaction to the memory address controller 202 is not required, and, in fact, some of the latency associated with retrieving the line of data from the main memories 200, 201 is hidden by the parallel access.

Assume the request originated on the second processor bus 102B. The DCF logic 210 compares the tag of the corresponding entry in the block 302 of the DCF memory 212 with the tag portion 402 of the address 400. If they do not match, and the status of the cache line in the block 302 is valid, the DCF logic 210 issues an invalidation transaction to the processor bus 102B to force inclusion of the new cache line. The address for the invalidation transaction is based on the tag retrieved from the indexed entry in the block 302 and the index portion 404 of the address 400. The invalidation transaction is routed by the interconnection logic 110 based on the requesting bus identifier information contained within the read transaction. The other blocks 300, 304 are checked based on the same tag and index portions 402, 404 to determine if the cache line is present on a different processor bus 102.

If no other processor bus 102 has a valid ownership or shared copy of the cache line, the original request is completed by the memory address controller 202 and the associated memory data buffer/multiplexer 204. In parallel with any back invalidation, the memory address controller 202 receives the appropriate line while the DCF logic 210 updates the tag 402 in the block 302 to that of the requesting address 400 and changes the state of the line in the block 302 to owned. If another processor bus 102 indicates that the cache line is in a shared state, the state of the line in the block 302 is changed to shared and the response to the requesting processor 104 on the processor bus 102B includes a shared indicator.

If the cache line is shared by one or more of the processor buses 102, the requesting bus 102B is added as one of the sharers of the cache line by updating the DCF memory 212.

If the cache line is owned (and potentially modified) on another processor bus 102, the DCF logic 210 forwards the request to the processor bus 102 that owns the cache line. If the cache line exists in a modified state, it is written back to the main memories 200, 201 and forwarded to the requesting processor bus 102B. It is contemplated that the data may be sent to the main memories 200, 201 first, and then forwarded to the requesting processor bus 102B, or alternatively, the request may be sent to the requesting processor bus 102B in parallel with the write-back. The status of the cache line in the DCF memory 212 is changed to shared in both the requesting processor bus 102B and the processor bus 102 holding the previously owned line.

If the cache line on the processor bus 102 owning the cache line is valid, but not modified, the snoop response is returned to the DCF logic 210 indicating a valid hit. The processor 104 owning the cache line may supply the requested data, or alternatively, the memory address controller 202 may supply the data. The final state for the cache line for both the requestor and the owner is shared. If the cache line on the processor bus 102 owning the cache line is invalid, the snoop response is returned to the DCF logic 210 indicating a miss. In such a case, the memory address controller 202 provides the data to the requestor and the DCF memory 212 is updated to owned. The previous owner's state is changed to invalid.

If the request is a "Read for Ownership" request, and one of the processor buses 102 has the cache line in an owned and modified state, the DCF memory 212 is updated to reflect the new owner. The modified data need not be written back to the 200, 201, but rather, the data may be transferred from one processor bus 102 to another processor bus 102 via the interconnection logic 110.

Any implicit write backs caused by victimization result in the changing of the status of the affected cache lines in the DCF memory 212 from owned to invalid.

If the request for data is a read for ownership transaction, and other processor buses 102 are determined to be sharing the cache line, an invalidation transaction or transactions may be multicast to the affected processor buses 102 to invalidate the cache line, and the DCF memory 212 is updated for the affected processor buses 102, accordingly. The DCF memory 212 is then updated to indicate that the cache line is owned by the requesting processor bus 102B.

The technique for maintaining cache coherency described herein has numerous advantages. Because the DCF logic 210 tracks cache lines using a subset of the address 400 (i.e., based on the index portion 404), only the most active cache lines are included. As a result, the size of the DCF memory 212 may be much smaller than the large array required for the directory based approach. Because all of the tags and states on the processor buses 102 are checked by the DCF logic 210 in parallel, the state of a particular cache line is known for the whole system 100 at once. Also, since each memory bank 108 has its own DCF logic 210, the contention for access to any particular cache line is greatly reduced. As a result, the bandwidth is available to read and update the DCF memory 212 even during periods of high access rates, because the accesses are spread across multiple memory banks 108.

Also, because the processors 104 on each processor bus 102 may work on different data and/or code sets, the most recently used address can, and most likely will, be different for each processor bus 102. This is addressed by tracking separate tag 402 and state data for each processor bus 102 with the same index portion 404 of the address 400.

Another advantage lies in the scalability of the DCF logic 210. As the number of processor buses 102 increases, the number of blocks 300, 302, 304, and the number of interfaces between the DCF logic 210 and the DCF memory 212 also increase. Single or multiple application specific integrated circuits (ASICS) may be used to implement the DCF logic 210. Still another advantage is seen in the ability of the DCF logic 210 to check the cache line status on all of the processor buses 102 based on a single memory request.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer system, comprising:
   a plurality of processor buses;
   a plurality of processors coupled to the processor buses, at least a portion of the processors having associated cache memories arranged in cache lines; and
   a memory bank coupled to the processor buses, the memory bank comprising:
      a main memory adapted to store data corresponding to at least a portion of the cache lines;
      a distributed coherency filter adapted to store coherency information related to the cache lines associated with each of the processor buses; and
      a memory device coupled to the distributed coherency filter, the memory device being divided into blocks, each block being adapted to store at least a portion of the cache lines associated with a particular one of the processor buses.

2. The computer system of claim 1, further comprising a plurality of interconnections between the distributed coherency filter and the memory device, each interconnection providing a memory address to access one of the blocks.

3. The computer system of claim 2, wherein each of the interconnections is adapted to transfer the coherency information for the associated processor bus between the distributed coherency filter and the memory device.

4. The computer system of claim 2, further comprising an address bus coupled to the distributed coherency filter and being adapted to receive a memory request from one of the processor buses, the memory request including a request address, wherein the distributed coherency filter is adapted to receive the request address and provide at least a portion of the request address as the memory address for accessing the memory device.

5. The computer system of claim 4, wherein the request address includes an index portion, and the memory address comprises the index portion.

6. The computer system of claim 1, further comprising:
   an address bus coupled to the distributed coherency filter, the address bus being adapted to receive a memory request including a request address from one of the processor buses, and the distributed coherency filter being adapted to retrieve the coherency information based on at least a portion of the request address.

7. The computer system of claim 6, wherein the request address includes a tag portion, the coherency information includes tag information, and the distributed coherency filter is adapted to compare the tag portion to the tag information and issue an invalidation transaction to the processor bus from which the memory request originated in response to the tag information not matching the tag portion.

8. The computer system of claim 7, wherein the request address includes an index portion, and the invalidation request includes an invalidation address based on the tag information and the index portion.

9. The computer system of claim 1, wherein the coherency information indicates a state of a particular cache line, wherein the state is at least one of owned, shared, and invalid.

10. The computer system of claim 6, further comprising:
    a memory address controller coupled to the address bus in parallel with the distributed coherency filter for receiving the request address and coupled to the main memory for accessing the data therein based on the request address.

11. A memory system for receiving memory requests from a plurality of processor buses, comprising:
    an address bus adapted to receive a memory request from one of the processor buses;
    a main memory adapted to store lines of data;
    a distributed coherency filter coupled to the address bus, the distributed coherency filter being adapted to store coherency information related to the lines of data associated with each of the processor buses and to access the coherency information based on the memory request; and
    a memory device coupled to the distributed coherency filter, the memory device being divided into blocks, each block being adapted to store at least a portion of the cache lines associated with a particular one of the processor buses.

12. The memory system of claim 11, further comprising an interconnection between the distributed coherency filter and the memory device for providing a memory address to access one of the blocks for each of the processor buses.

13. The memory system of claim 12, wherein the interconnection is adapted to transfer the coherency information for the associated processor bus between the distributed coherency filter and the memory device.

14. The memory system of claim 12, wherein the memory request includes a request address and the distributed coherency filter is adapted to receive the request address and provide at least a portion of the request address as the memory address for accessing the memory device.

15. The memory system of claim 14, wherein the request address includes an index portion, and the memory address comprises the index portion.

16. The memory system of claim 11, wherein the request address includes a tag portion, the coherency information includes tag information, and the distributed coherency filter is adapted to compare the tag portion to the tag information and issue a back invalidation transaction to the processor bus from which the memory request originated in response to the tag information not matching the tag portion.

17. The memory system of claim 16, wherein the request address includes an index portion, and the invalidation request includes a back invalidation address based on the tag information and the index portion.

18. The memory system of claim 11, wherein the coherency information indicates a state of a particular cache line, wherein the state is at least one of owned, shared, and invalid.

19. The memory system of claim 11, further comprising:
    a memory address controller coupled to the address bus in parallel with the distributed coherency filter for receiving the request address and coupled to the main memory for accessing the data therein based on the request address.

20. A method for maintaining cache coherency among processors coupled to a plurality of processor buses, comprising:

storing lines of data in a main memory;

receiving a memory request for a particular line of data in the main mem ory from one of the processor buses;

storing coherency information related to the lines of data associated with each of the processor buses in a memory device having a plurality of blocks, each block being adapted to store at least a portion of the cache lines associated with a particular one of the processor buses; and accessing the coherency information based on the memory request.

21. The method of claim 20, further comprising providing a memory address to each of the blocks simultaneously.

22. The method of claim 21, wherein the memory request includes a request address, and providing the memory address includes providing at least a portion of the request address as the memory address for accessing the memory device.

23. The method of claim 22, wherein the request address includes an index portion, and providing the memory add comprises providing the index portion.

24. The method of claim 20, wherein the request address includes a tag portion, the coherency information includes tag information, and the method further comprises:

comparing the tag portion to the tag information; and issuing an invalidation transaction to the processor bus from which the memory request originated in response to the tag information not matching the tag portion.

25. The method of claim 24, wherein the request address includes an index portion, and issuing the invalidation transaction includes:

determining an invalidation address based on the tag information and the index portion; and issuing the invalidation transaction based on the invalidation address.

26. The method of claim 20, further comprising accessing the main memory in parallel with accessing the coherency information.

27. A memory system for maintaining cache coherency among processors coupled to a plurality of processor buses, comprising:

means for storing lines of data;

means for receiving a memory request for a particular line of the data from one of the processor buses;

means for storing coherency information related to the lines of data associated with each of the processor buses in a memory device having a plurality of blocks, each block being adapted to store at least a portion of the cache lines associated with a particular one of the processor buses; and means for accessing the coherency information based on the memory request.

28. A computer system, comprising:

a plurality of processor buses;

a plurality of processors coupled to the processor buses, at least a portion of the processors having associated cache memories arranged in cache lines; and a memory bank coupled to the processor buses, the memory bank comprising:

a main memory adapted to store data corresponding to at least a portion of the cache lines; and a distributed coherency filter adapted to store coherency information related to the cache lines associated with each of the processor buses;

an address bus coupled to the distributed coherency filter, the address bus being adapted to receive a memory request including a request address from one of the processor buses, and the distributed coherency filter being adapted to retrieve the coherency information based on at least a portion of the request address; and a memory address controller coupled to the address bus in parallel with the distributed coherency filter for receiving the request address and coupled to the main memory for accessing the data therein based on the request address.

29. The computer system of claim 28, wherein the request address includes a tag portion, the coherency information includes tag information, and the distributed coherency filter is adapted to compare the tag portion to the tag information and issue an invalidation transaction to the processor bus from which the memory request originated in response to the tag information not matching the tag portion.

30. The computer system of claim 29, wherein the request address includes an index portion, and the invalidation request includes an invalidation address based on the tag information and the index portion.

31. The computer system of claim 28, wherein the coherency information indicates a state of a particular cache line, wherein the state is at least one of owned, shared, and invalid.

32. A memory system for receiving memory requests from a plurality of processor buses, comprising:

an address bus adapted to receive a memory request from one of the processor buses;

a main memory adapted to store lines of data;

a distributed coherency filter coupled to the address bus, the distributed coherency filter being adapted to store coherency information related to the lines of data associated with each of the processor buses, and to access the coherency information based on the memory request; and a memory address controller coupled to the address bus in parallel with the distributed coherency filter for receiving the request address and coupled to the main memory for accessing the data therein based on the request address.

33. The memory system of claim 32, wherein the request address includes a tag portion, the coherency information includes tag information, and the distributed coherency filter is adapted to compare the tag portion to the tag information and issue a back invalidation transaction to the processor bus from which the memory request originated in response to the tag information not matching the tag portion.

34. The memory system of claim 33, wherein the request address includes an index portion, and the invalidation request includes a back invalidation address based on the tag information and the index portion.

35. The memory system of claim 15, wherein the coherency information indicates a state of a particular cache line, wherein the state is at least one of owned, shared, and invalid.

36. A method for maintaining cache coherency among processors coupled to a plurality of processor buses, comprising:

storing lines of data in a main memory;

receiving a memory request for a particular line of data in the main memory from one of the processor buses;

storing coherency information related to the lines of data associated with each of the processor buses;

accessing the coherency information based on the memory request; and accessing the main memory in parallel with accessing the coherency information.

37. The method of claim 36, wherein the request address includes a tag portion, the coherency information includes tag information, and the method further comprises:

comparing the tag portion to the tag information; and issuing an invalidation transaction to the processor bus from which the memory request originated in response to the tag information not matching the tag portion.

38. The method of claim 37, wherein the request address includes an index portion, and issuing the invalidation transaction includes:

determining an invalidation address based on the tag information and the index portion; and issuing the invalidation transaction based on the invalidation address.

39. A memory system for maintaining cache coherency among processors coupled to a plurality of processor buses, comprising:

means for storing lines of data in a main memory;

means for receiving a memory request for a particular line of data in the main memory from one of the processor buses;

means for storing coherency information related to the lines of data associated with each of the processor buses;

means for accessing the coherency information based on the memory request; and means for accessing the main memory in parallel with accessing the coherency information.

* * * * *